April 3, 1962   A. L. SCHOLL ET AL   3,028,152
RESURFACING TOOL
Filed Sept. 7, 1961   2 Sheets-Sheet 1
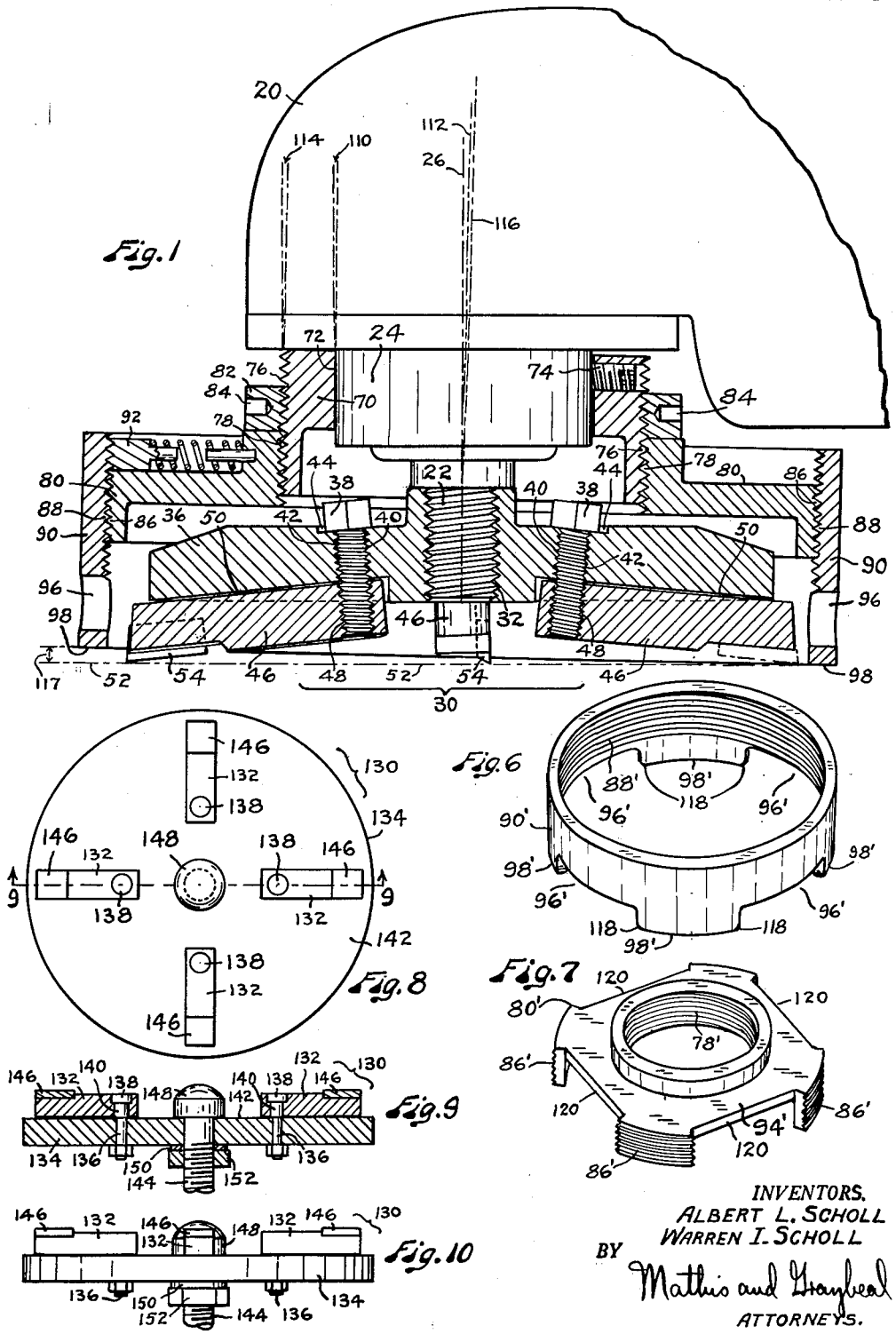
INVENTORS.
ALBERT L. SCHOLL
WARREN I. SCHOLL
BY Mathis and Graybeal
ATTORNEYS.

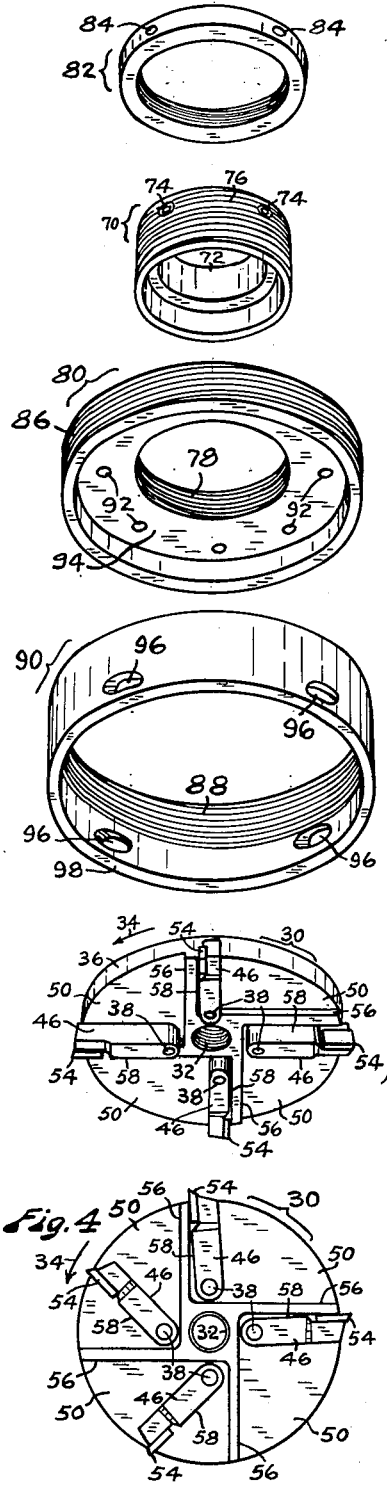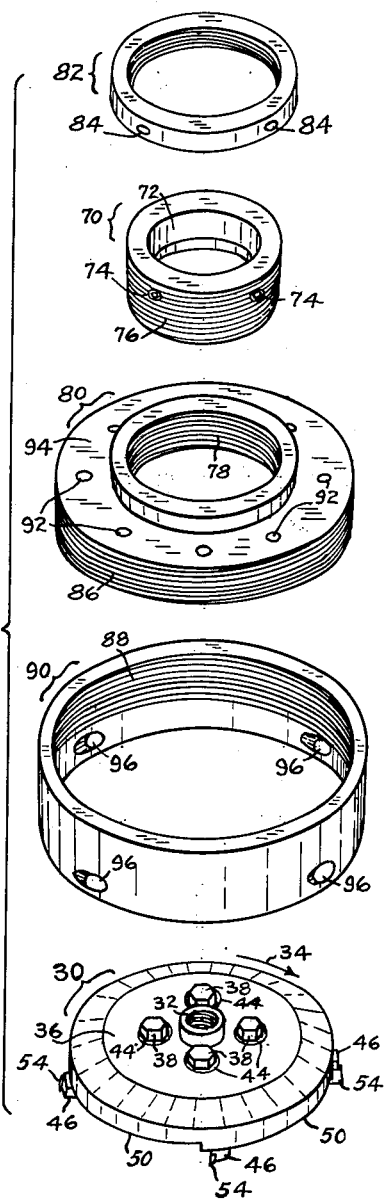

United States Patent Office 3,028,152
Patented Apr. 3, 1962

3,028,152
RESURFACING TOOL
Albert L. Scholl, 23212 Bothell Way, Bothell, Wash., and Warren I. Scholl, 10735 Densmore, Seattle, Wash.
Filed Sept. 7, 1961, Ser. No. 136,991
10 Claims. (Cl. 262—19)

This invention relates to rotary type high speed tools, and more particularly relates to resurfacing or refinishing tools for application against a work surface or base material of wood, metal, linoleum, plastic laminate, stone, or the like, for refinishing or resurfacing same. Specific typical and therefore non-limitive examples of utilization of the principles of the present invention are found in the removal of linoleum, plastic or plastic laminate coverings and glue layers from drain boards, counters, tables, desks or floors preparatory to installation of another linoleum, plastic or plastic laminate covering thereon, and to removal of heavy coatings of paint or varnish from wood or metal surfaces incident to recoating same.

Considered generally, the present invention brings to the resurfacing and refinishing art a tool having a cutter head on which is mounted a plurality of cutter elements, the cutter elements being mounted on a mounting disk or backing plate so as to be supported thereagainst when cutting, yet be pivotally movable thereon about axes substantially parallel to the axis of rotation of the cutter head, the pivotally mounted cutter elements in operation normally tending to be maintained in a radial position on the cutter head by virtue of the centrifugal action generated from the high speed rotation of the cutter head, the pivotally mounted cutter elements nevertheless having the capability of making a relatively light cut and being self-cleaning, i.e. to turn back and free themselves if the cutters are inadvertently manipulated to dig too deeply into the wood surface, and in the process of the swinging and trailing action thereof in use, generating a blower action facilitating removal of chip particles from the work surface.

A very important related feature of the present invention is found in the fact that the cutter elements, when contacting the work surface, tend to drag and swing back from a radial position, causing the cutter blades to have a swiping or wiping action against the work surface, which action is very effective in cleaning the cutter blades. This is particularly important when glued linoleum or plastic laminate is being removed, because otherwise the glue or backing material tends to clog and gum up the cutter blades. This swiping or wiping action has the further advantage of increasing the efficiency of cut of the cutting elements against the work surface, since the cutting elements are in effect drawn across the work obliquely.

Incident to this self-cleaning and blower action features of the invention, it is an important characteristic of the cutter elements of the present invention that they have a relatively wide dimension parallel to the axis of rotation of the cutter head, i.e. across the direction of movement of the cutter elements, in order that the blower function be facilitated. Considered generally, the present invention is further characterized, in the preferred form thereof, by a ring guard encircling the cutter head, which ring guard is adjustable not only in the direction of the axis of rotation to regulate depth of cut, but also adjustable to any selected slight offset angle with respect to the axis of rotation of the cutter head, in order that the cutter head be disposed at a slight slope with respect to the work surface to facilitate the cutting action and render the same more uniform.

In addition to the foregoing features, further objects and advantages of the present invention are found in the provision for rapid and efficient removal of a comparatively thin dimension of a work surface, in the elimination of the conventional difficult and time consuming scraping or sanding tasks whenever a laminate or linoleum or like layer of material and a glue or putty layer must be removed from a base surface incident to renewal of the covering material. Equally evident as an advantage of the present invention is the elimination of the necessity for conventional sanding or chemical removal means when removing heavy layers of paint, glue or varnish or other gummy materials from wood or metal surfaces preparatory to recoating same.

Other objects and advantages of the present invention are found in the provision of a resurfacing tool which is simple yet durably constructed, which is safe in operation, which is compact and easy to fabricate and maintain, and which provides self-protection of the cutter elements against unusually hard obstructions such as nails or screws which may be encountered in the work surface, since the cutter elements will yield from their normally radial position. Related objects and advantages are found in the fact that the cutter elements of the present invention are self-cleaning and by their yielding action tend to minimize and render overcutting and non-uniformity of cutting much easier to control, as well as the provision for precise adjustments of the depth and angle of attack of the cutters.

These and other various and more specific objects and advantages of the present invention will be apparent from the following disclosure of certain typical and therefore non-limitive embodiments thereof, and in the accompanying drawings, wherein like elements refer to like parts and wherein:

FIG. 1 is a side elevational view, with various parts shown in cross section, illustrating a preferred form of the present invention wherein the cutter head is encircled by an adjustable ring guard, the cutter head and guard being mounted on a conventional angle head motor, shown in fragmentary view;

FIG. 2 is an exploded perspective view from a lower aspect of the cutter head, ring guard, web plate, mounting sleeve and lock ring of the assembly shown in FIG. 1;

FIG. 3 is an exploded perspective view of the elements shown in FIG. 2, as viewed from an upper aspect;

FIG. 4 is a bottom view of the cutter head shown in FIGS. 1–3;

FIG. 5 is a side view of the cutter head shown in FIGS. 1–4;

FIG. 6 is a perspective view of a modified form of ring guard with chip discharging openings recessed in the bottom edge of the ring guard;

FIG. 7 is a perspective view of a modified form of web plate, with circumferential portions thereof cut away to provide chip discharge openings;

FIG. 8 is a bottom view of a modified form of cutter head characterizing the present invention;

FIG. 9 is a cross sectional view of the cutter head shown in FIG. 8, taken substantially along line 9—9 thereof; and FIG. 10 is a side view of the cutter head shown in FIGS. 8 and 9.

Turning now to a specific consideration of a typical embodiment of the invention, as illustrated in FIGS. 1–5, the various elements shown in cross section in FIG. 1 and shown in perspective exploded views in FIGS. 2 and 3 are adapted to be mounted on any conventional rotary motor, such as an angle head motor 20 of the type shown in U.S. Patent 2,819,570, for example. Such an angle head motor is designed to operate at 5500 r.p.m., and includes a drive spindle 22 and a cylindrically shaped throat or neck portion 24 concentric with the axis of rotation 26 of threaded drive spindle 22.

Cutter head 30 is affixed to spindle 22 by threads 32, the direction of rotation in the example selected being counterclockwise as cutter head 30 is viewed in FIG. 2, as indicated at 34.

Said cutter head 30 comprises a mounting disk or backing plate 36 receiving a plurality of cutter element mounting bolts 38, four being shown by way of example, each having left hand threads 40, and each being received in a similarly threaded recess 42 in mounting disk 36, said recesses 42 being disposed so as to be substantially parallel to but slightly offset from the axis of rotation 26 of drive spindle 22 and said mounting disk 36, such offset being preferable but not essential to the present invention, for reasons discussed hereinafter. The upper surface of mounting disk 36 is provided with a plurality of offset recesses 44 to squarely receive the heads of cutter element mounting bolts 38.

Cutter bars 46 are pivotally mounted on mounting disk 36 by means of threaded recesses 48 in threaded engagement with the lower ends of the corresponding mounting bolts 38, each said mounting bolt 38 being threadingly assembled with the associated threaded recess 42 in mounting disk 36 and the threaded recess 48 in cutter bar 46 so that the cutter bar 46 is contiguous of the associated lower surface 50 of mounting disk 36 with slight clearance therebetween so that the latter is freely and pivotally movable about the associated mounting bolt 38 when the cutter head is at rest. Characteristic of the invention, however, the nature of the pivotal mounting of the cutter bars 46 on mounting disk 36 is such that the lower surfaces 50 of disk 36 provide substantially coextensive backing means spanning the cutter bars 46 and supportably bracing same when the bars 46 are in cutting engagement with a work surface, such backing support of bars 46 being effected without preventing pivotal movement of the cutter bars 46 on mounting bolts 38 when under cutting load.

As best seen in FIGS. 2 and 5, the backing surfaces 50 of mounting disk 36 are associated with the cutter bars 46, with each backing surface 50 disposed in a plane substantially perpendicular to the axis of rotation of the associated cutter bar 46, and with each consequently offset slightly from the plane of cut 52 of cutter blades 54 at the free ends of cutter bars 46, it being an important advantage of this form of the invention that when the cutter bars become displaced from a substantially radial position from the axis of rotation 26 to a somewhat trailing position by action of the cutter blades 54 digging into the work surface, the slightly offset disposition of the pivot action of the cutter bar 46 and the slightly divergent disposition of the lower surface 50 collectively permit the cutter blade 54 to move away from and be slightly raised from the work surface, thus decreasing the amount of cut thereof and promoting the self-cleaning action of the cutter elements while wiping obliquely against the work surface. The trailing action also relieves the cutting action if the cutter elements become over-burdened, and consequently effectively safeguard the drive motor from overloading.

In the form of the invention shown, cutter blades 54 are carbide tipped, and it will be readily evident that any other suitable hard material can be employed as the cutting elements, consistent with the requirements of the particular work surface presented.

In connection with the foregoing consideration of the slightly offset planar surfaces 50 on the lower side of mounting disk 36, it will also be noted that this arrangement provides ledge portions 56 contacted by the cutter bars 46 at the extreme trailing position thereof in order to obviate any possibility of the cutter bar 46 fouling or otherwise interfering with the normal arc of movement of the adjacent cutter bars.

From the foregoing discussion of the arrangement of cutter bars 46 on mounting disk 36 in the makeup of cutter head 30, it will be readily understood that rotation of the cutter head at high speed about axis 26 will result in the cutter bars 46 normally tending to stand out radially of said axis, by virtue of the centrifugal action involved, and that when the cutter head is applied to a work surface generally along the plane of cut 52, then the cutter bars will be displaced to a trailing or lagging position, the degree of displacement depending upon the degree of resistance encountered by the cutter blades 54 when engaging the work surface.

Further to be considered in connection with the specific form of cutter bars 46, as presented in FIGS. 1–5, is the fact that such cutter bars 46 have a substantial dimension parallel to the axis of rotation 26, i.e. leading sides 58 (see FIGS. 2 and 4, for example) are compartively wide, transversely considered, which width dimension of cutter bars 46, functioning with the intermittent and dynamic trailing condition of the cutter bars 46, generates a blower action further facilitating removal of cut particles from the work surface and the cutter elements. This feature is a very important advantage in the resurfacing and refinishing art because keeping the work surface and cutter blades from being fouled by cut particles is often a very serious problem. Obviously, the high speed rotation of the cutter bars 46 will also of itself tend to promote cleaning as to any particles adhering directly on the cutter bars 46 or cutter blades 54.

Having in view the detailed nature of the cutter head portion of the form of the invention shown in FIGS. 1 through 5, consideration will now be given to the ring guard and the various adjustments for regulating the height and degree of offset thereof. Giving attention to FIGS. 1–3 collectively, the adjustable ring guard and means for mounting and adjusting same include mounting sleeve 70 having an interior bore 72 closely encircling throat or neck portion 24 of angle head motor 20 and fixed thereon by means of set screws 74. The external cylindrical surface of mounting sleeve 70 is threaded, as indicated at 76, and receives the threaded interior bore 78 of web plate 80, threaded locking ring 82 also being provided to lock said web plate 80 at any selected setting thereof on mounting sleeve 70, wrench receiving holes 84 being arranged circumferentially around locking ring 82, in a manner conventional per se.

The outer, cylindrically disposed, surface of web plate 80 is also threaded, as indicated at 86, and receives the interior threaded surface 88 of ring guard 90. Spring loaded locking shoe 92 (FIG. 1) serves to maintain said ring guard 90 at any selected position of adjustment on web plate 80. Both web plate 80 and ring guard 90 are provided with chip discharge openings, the chip discharge openings 92 in web plate 80 being generally centrally and annularly disposed in the web 94 thereof, and the chip discharge openings 96 in ring guard 90 being disposed near the lower, work surface engaging edge 98, said edge 98 being left unbroken, however, in order to not interfere with the smooth movement thereof across the work surface.

As will be apparent from the arrangements shown in FIG. 1, ring guard 90 in addition to its obvious safety function, also provides, by means of lower edge 98 thereof, a guide surface for contacting the work surface to regulate the depth and extent of cut of cutter blades 54. Since said cutter blades 54 progressively remove the thickness of the work surface, it is preferable and advantageous to have the lower edge 98 of ring guard 90 disposed in a slightly offset plane from the plane of cut 52 of cutter head 30 in order that progressive removal of a thickness of the work surface will proceed substantially uniformly. To this end, the embodiment presented in FIGS. 1–3 as to the arrangement for the mounting of ring guard 90 has provision for adjustment as to degree of offset between lower edge 98 of ring guard 90 and the plane of cut 52.

In the arrangement shown, with angles of offset being slightly exaggerated to permit illustration, the line of interior bore 72 of mounting sleeve 70 is at a slight angle with respect to the line of external threads 76, such bore line being offset from the line of the exterior threads 76 of said mounting sleeve 70 by an offset angle of about 1°, for example, such offset angle being indicated for illustration at 110. Thus, with said mounting sleeve 70 in the rotational position shown in FIG. 1, the concentric axis of threads 76 thereof is displaced slightly from the axis of rotation 26 of cutter head 30, the mounting sleeve displaced axis for the illustrated rotational position being indicated at 112.

Similarly, the line of interior threads 78 of web plate 80 is offset from the line of exterior threads 86 thereof by an offset angle 114 of about 1°, for example. The collective result of offset angles 110 and 114, when mounting sleeve 70 and web plate 80 are in the relative positions shown in FIG. 1, is to displace the axis of threads 86 of web plate 80, and consequently the axis of ring guard 90 to the position indicated at 116, the lower or guide edge 98 of ring guard 90 thereby being displaced from the line of cut 52 by the angle indicated at 117.

Considering now the various available points of adjustability of ring guard 90 with respect to cutter head 30, it is to be first noted that the average depth of cut is adjustable by selective rotation of ring guard 90 on web plate 80 through rotation of web plate 80 on mounting sleeve 70 through complete revolutions, as well as by selective setting of mounting sleeve 70 on throat or neck portion 24 of the angle head motor 20. Further, with regard to adjustability of the degree of offset of ring guard 90 as compared with the line of cut 52, it is to be observed that such offset can be adjusted from a position of no offset (with displaced axes 112 and 116 opposed and thereby canceling each other) to an angle of offset 117 which is the vectoral sum of offset angle 110 and offset angle 114, the position of maximum offset being reached when said angles of offset 110 and 114 are disposed in the same radial position from the axis of rotation 26. As has been indicated, one case of maximum offset adjustment is illustrated in FIG. 1. Any degree of offset angle 117 can be achieved in any radial direction from axis 26 by appropriate relative rotation of mounting sleeve 70 about throat or neck portion 24 and/or relative rotation of web plate 80 about mounting sleeve 70. From the foregoing, further variations in the placement and arrangement of the offset angles as between the adjustable members and as to the extent of offset will be apparent to those skilled in the art.

In use, it has been found quite advantageous to dispose the collective offset angle (i.e. the vectoral sum of offset angles 110 and 114) in the direction best suited the natural cutting swing of the user, with the offset 117 between the line of cut 52 and lower edge 98 of ring guard 90 at about the depth of the layer to be removed in one pass of the tool (as shown at the left in FIG. 1), and with the line of cut 52 and the lower edge 98 substantially coincident at the opposite side of ring 90 (as shown at the right in FIG. 1). With the offset and depth thus set, movement of the tool set as shown in FIG. 1 into the work surface in a direction from right to left causes the desired work surface layer introduced at offset 117 to be chipped away, yet nevertheless leaves the resurfaced or refinished work surface emerging at the opposite side of ring 90 relatively smooth.

A further advantage of the adjustable offset angle of attack occurs in an alternative manner of use whereby the tool, set as shown in FIG. 1, is moved from left to right so that the left hand portion of guide edge 98 progressively drops into the cut work surface area. This manner of operation of the tool quickly gives a selective, deeper or "dished" cut in one area of the work surface, if desired.

The flexibility of use of a tool with a slightly offset guide surface and slightly offset angle of attack is further augmented by the fact that the offset angle permits the cutters to cut along only one side or arc of the rotating cutter head. This often provides an important operational advantage, such as when the operator wishes to work into a corner or resurface only an edge of a work surface. Full radial adjustability of the angle of offset also permits the operator to adjust the guide so that the cutter will cut predominantly in any desired direction, thus making it possible to direct the discharge of cut particles in any desired direction and to cut either with or across the grain of a wood surface in a manner preventing splitting of the grain.

The self-cleaning and self-relieving characteristics of the pivoted cutter bars, in cooperation with the close control of depth and degree of offset of the guide surface, collectively provide that the cutter head can be readily adjusted and manipulated to take a remarkably rapid and uniform cut, with improved controlability, and without any substantial tendency for the tool to "crawl," as is often the case with conventional high speed rotary tools.

With the controlled cut and rapid removal of cut particles, as characterize the present invention, it has proven quite possible in practice to widely vary the cut depth. Use of the form of the invention shown in FIG. 1 for removal of one or several layers of linoleum or plastic laminate from a base surface, for example, has shown that the linoleum or laminate layer or layers can be rapidly removed in either one or several separate passes, as desired, with considerable assurance that the base surface will not be removed excessively and will be sufficiently smooth and level to receive the new linoleum or laminate without further conditioning of the base surface.

While cut particle discharge openings are respectively provided at 92 and 96 in web plate 80 and ring guard 90 in the form of the invention considered above, wide variation is possible as to the disposition and area thereof. Thus, by way of further example, FIG. 6 presents a modified form of ring guard 90', having interior threads 88' for adjustment like threads 88 of ring guard 90, and having open discharge openings 96' cut away in the lower edge 98' thereof, the corners of the guide edge 98' of said ring guard 90' being rounded, as indicated in two instances at 118 in FIG. 6, to permit smooth movement of the tool across the work surface.

Correspondingly, FIG. 7 shows a modified form of web plate 80' having interior threads 78' like threads 78 of web plate 80 and further providing exterior threads 86' along arcs or segments, the portions of web 94' between said threaded segments 86' being cut away as indicated at 120 to provide larger and more outwardly disposed cut particle discharge openings in the areas between web 94' and the ring guard encircling the web plate. In connection with the modified form of web plate 80' shown in FIG. 7, it will also be evident that an unbroken guard ring can readily be employed therewith, similar to guard ring 90 but omitting any form of discharge opening. As indicated, further variations as to cut particle discharge openings will be apparent to those skilled in the art. Likewise evident is the fact that both the ring guard and web plate can be full enclosures, except across the bottom edge of the ring guard, with the cut particles removed by a suction exhaust line, in a manner conventional per se.

FIGS. 8, 9 and 10 present a modified form of cutter head 130 of somewhat simplified construction, designed to provide a centrally disposed, rotating guide nub to regulate the depth of cut of the cutter elements, and designed to be used optionally either with or without an encircling guide or guard means. Specifically, said modified form of cutter head 130 comprises a plurality of cutter bars 132, four being shown, pivotally mounted to mounting disk or plate 134 by means of pivot bolts 136, said bolts 136 having an enlarged head portion 138 and an enlarged shank portion 140, respectively functioning to retain the associated cutter bar 132 and space said bar slightly from the under surface 142 of said mounting disk or plate 134 in order to permit a yielding, pivotal movement of said cutter bars 132 about axes concentric with the center of said pivot bolts 136 in essentially the same manner as do cutter bars 46 in the form of the invention earlier discussed. As shown, it is to be noted that, in the modified form of cutter head 130 as presented in FIGS. 8–10, the entire undersurface 142 of the mounting disk or plate 134 is planar, and that the pivot axes provided by bolts 136 are parallel to the axis of rotation of shaft or spindle 144. Cutter bars 132 each mount a cutter element 146. Shaft 144 is connected to and driven by a suitable high speed rotary power source such as spindle 22 of angle head motor 20 in FIG. 1, and the cutter head mounting plate 134 is anchored to drive shaft 144 between guide nub 148, and lock washer 150 and nut 152.

Guide nub 148 functions as the work surface riding element, in a manner conventional per se. While said guide nub 148 in effect is only a point of guide, as compared with the area of guide provided by lower edge 98 of ring guard 90 in the first form of the invention considered, a point rather than area type of guiding contact is satisfactory in many use instances and is even preferable on certain occasions, such as when working on a convex or concave curved surface, as is typical of metal, wood or glass fiber boat hull surfaces, or automobile body surfaces, for example. Equally evident is the possibility of using a nub type guiding contact, as by centrally disposed nub 148, conjunctively with an encircling guard ring comparable to guard ring 90 with the latter performing only a guard function in that it is spaced slightly above the work surface or is urged against the work surface by suitable spring loading.

The configuration and dimensions of the guiding surface (e.g. edge 98) can be varied markedly. Thus, by way of further examples in this regard, the guiding surface can be relatively wide, considered radially of the cutter head in the general manner of a planar guide, or can mount several (e.g. three) annularly arranged nubs, each independently adjustable as to height.

Likewise, while the specific forms of the invention as presented above have been identified with reference to a portable, angle head type motor, the utilization thereof with other types of portable motors having straight motor shafts, or with equipment employing flexible drive shafts, or on fixed equipment, will also be evident.

These and other modifications, features and advantages of the present invention, as available from the foregoing description of certain typical and therefore non-limitive forms and variations thereof, as well as various further modifications, arrangements, and fields of utilization of same will be readily apparent to those skilled in the art, within the scope and spirit of the following claims.

This application is a continuation-in-part of our co-pending application Serial No. 755,507, filed August 18, 1958, entitled Resurfacing Tool, now abandoned.

What is claimed is:

1. In a rotary type high-speed tool designed to rotate against a hard, substantially planar work surface; a cutter head comprising a mounting plate having a plurality of cutter elements mounted thereon, and means rotating said cutter head at high speed about an axis substantially perpendicular to said work surface, said cutter elements being mounted on said mounting plate so as to be pivotally movable thereon about axes substantially parallel to said first named axis, the said mounting plate being laterally at least substantially coextensive with said cutter elements and providing backing means for said cutter elements when the latter are in cutting engagement with said work surface.

2. In a rotary type high-speed tool designed to rotate against a hard, substantially planar work surface; a rotatable cutter element mounting plate, power means rotating said mounting plate at high speed, and means pivotally mounting a plurality of cutter elements to said mounting plate so as to be relatively movable with respect to said plate about axes disposed substantially perpendicular to the work surface, said cutter elements tending to be maintained in radially disposed position on said mounting plate as the latter is rotated at high speed and tending to yield from such radial position when contacting the work surface, the said mounting plate including backing surface portions contiguous to and at least substantially coextensive with said cutter elements for bracing same when said cutter elements are in cutting engagement with said work surface.

3. In a rotary type high-speed tool designed to rotate against a hard, substantially planar work surface; a cutter head comprising a backing plate spanning a plurality of cutter elements contiguously mounted thereon, and means rotating said cutter head at high speed about an axis substantially perpendicular to said work surface, said cutter elements being mounted on said backing plate to be supported thereagainst yet pivot thereon about axes substantially parallel to said first named axis when said cutter elements are in cutting engagement with said work surface, and said cutter elements having a relatively wide dimension across the direction of movement thereof when said cutter head is rotated.

4. In a rotary type high-speed power tool designed to rotate against a hard, substantially planar work surface; a rotatable cutter head comprising a backing plate spanning a plurality of cutter elements pivotally mounted thereon contiguously of said mounting plate so as to be supported thereagainst yet be relatively movable with respect to said plate about axes disposed substantially perpendicular to the work surface when said cutter elements are in cutting engagement with said work surface, said cutter elements tending to be maintained in radially disposed position on said mounting plate as the latter is rotated at high speed and tending to yield from such radial position when contacting the work surface, the said cutter elements having a substantial transverse dimension contiguous to and standing out from said mounting plate to generate a blower action for removal of cut work surface particles.

5. A tool for resurfacing a hard work surface of wood, metal, plastic laminate, stone or the like, comprising a cutter head disposable substantially parallel to said work surface, said cutter head comprising a plurality of cutter elements spanned by and pivotally mounted on a backing plate to pivot contiguously of said plate and be supported thereagainst when in cutting engagement with the work surface, such pivotal movement being about axes substantially parallel to the axis of rotation of said cutter head, said cutter elements having a substantial dimension parallel to said axis of rotation, and such tool further comprising means rotating said cutter head at high speed and causing said cutter elements to tend to extend substantially radially thereof, the respective pivotal mountings of said cutter elements permitting such to lag from substantially radially disposed position when impacting said work surface, the said dimension of said cutter elements and the periodic trailing position thereof generating a blower action facilitating evacuation of removed particles from said work surface.

6. A rotary type high-speed tool designed to rotate substantially against the plane of a hard work surface about an axis of rotation substantially perpendicular to said work surface, a rotatable cutter element mounting plate, power means rotating said mounting plate at high speed, a plurality of cutter elements, and means pivotally mounting said plurality of cutter elements to said mounting plate so as to be relatively movable with respect to said plate about axes disposed substantially perpendicular to the work surface, said cutter elements tending to be maintained in radially disposed position on said mounting plate as the latter is rotated at high speed and tending to yield from such radial position to a trailing position when contacting the work surface, the pivot axes of said cutter element being at a slight offset angle from the said cutter head axis of rotation and disposed so that each cutter element when in said trailing position is withdrawn slightly from the work surface.

7. In a rotary type high-speed tool for resurfacing a hard work surface by means of a rotatable cutter mounting plate with a plurality of cutter elements mounted thereon, and means rotating said cutter mounting plate at high speed about an axis substantially perpendicular to the work surface; the improvement comprising means mounting each of said cutter elements on said mounting plate so as to be pivotally movable thereon about axes substantially perpendicular to said work surface, each such cutter element having contiguously associated therewith a surface portion of said mounting plate disposed to span and serve as a backing surface by engageably supporting the cutter element when said cutter element is in pressure engagement with the work surface.

8. In a rotary type high-speed tool for resurfacing a hard work surface by means of a rotatable cutter mounting plate with a plurality of cutter elements mounted thereon, and means rotating said cutter mounting plate at high speed about an axis substantially perpendicular to the work surface; the improvement comprising means pivotally mounting said cutter elements to said mounting plate so as to be relatively pivotable about axes substantially parallel to but slightly angularly offset from the axis of rotation of said mounting plate, such pivotal mounting and slight axial offset providing that said cutter elements tend to be disposed substantially radially of the axis of rotation when the mounting plate is rotated at high speed and tend to yield to a trailing, slightly withdrawn position when in cutting contact with the work surface.

9. In a rotary type high-speed tool for resurfacing a hard work surface by means of a rotatable cutter mounting plate with a plurality of cutter elements mounted thereon, and means rotating said cutter mounting plate at high speed about an axis substantially perpendicular to the work surface; the improvement comprising means pivotally mounting said cutter elements to said mounting plate so as to be relatively pivotable about axes substantially parallel to but slightly angularly offset from the axis of rotation of said mounting plate, such pivotal mounting and slight axial offset providing that said cutter elements tend to be disposed substantially radially of the axis of rotation when the mounting plate is rotated at high speed and tend to yield to a trailing, slightly withdrawn position when in cutting contact with the work surface, each said cutter element having contiguously associated therewith a surface portion of said mounting plate disposed to serve as a backing surface supporting the cutter element when said cutter element is in pressure engagement with the work surface.

10. A tool according to claim 9, wherein said mounting plate further comprises raised ledge portions between the various adjacent cutter element backing surface portions thereof to limit the arcs of movement of the various cutter elements and prevent any cutter element from interfering with the normal pivotal movement of the cutter elements adjacent thereto.

References Cited in the file of this patent
UNITED STATES PATENTS
2,634,571      Lawrence et al. _____ Apr. 14, 1953